US011849676B2

(12) United States Patent
Worley et al.

(10) Patent No.: US 11,849,676 B2
(45) Date of Patent: Dec. 26, 2023

(54) SYSTEMS AND METHODS FOR BALING MATERIALS

(71) Applicant: Walmart Apollo, LLC, Bentonville, AR (US)

(72) Inventors: Katherine A. Worley, Bentonville, AR (US); Jeffrey A. Kerbs, Bella Vista, AR (US); Antonio Villagomez, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 300 days.

(21) Appl. No.: 17/006,483

(22) Filed: Aug. 28, 2020

(65) Prior Publication Data
US 2021/0068346 A1 Mar. 11, 2021

Related U.S. Application Data

(60) Provisional application No. 62/896,499, filed on Sep. 5, 2019.

(51) Int. Cl.
*B30B 9/30* (2006.01)
*A01F 15/08* (2006.01)
*A01F 15/07* (2006.01)

(52) U.S. Cl.
CPC ............ *A01F 15/08* (2013.01); *A01F 15/071* (2013.01); *B30B 9/3007* (2013.01); *A01F 2015/076* (2013.01)

(58) Field of Classification Search
CPC .... A01F 15/071; A01F 15/08; A01F 15/0825; A01F 2015/076; B30B 9/3007; B30B 9/30; B65B 13/182
See application file for complete search history.

(56) References Cited

U.S. PATENT DOCUMENTS

| 3,815,313 | A | 6/1974 | Heisler |
| 5,628,412 | A | 5/1997 | Hulls |
| 7,146,294 | B1 * | 12/2006 | Waitkus, Jr. ....... G01G 23/3728 340/613 |

(Continued)

FOREIGN PATENT DOCUMENTS

SE 9403599 1/1996

OTHER PUBLICATIONS

U.S. Appl. No. 60/617,971, filed Oct. 11, 2004, Sasine John.

(Continued)

*Primary Examiner* — Andrew M Tecco
(74) *Attorney, Agent, or Firm* — Fitch, Even, Tabin & Flannery LLP

(57) ABSTRACT

In some embodiments, apparatuses and methods are provided herein useful to baling materials. In some embodiments, there is provided a system for baling recyclable materials including a baling a machine configured to compress materials into a shape suitable for at least one of storage and transportation; the materials comprising mixed type recyclable materials, the material not comprising added cardboard header materials configured to structurally enhanced the shape having been compressed; baling wire configured to twine and secure the materials compressed by the baling machine resulting in a bale comprising twined and compressed materials; and shrink film configured to wrap around the bale.

16 Claims, 7 Drawing Sheets

(56) References Cited

U.S. PATENT DOCUMENTS

| | | | |
|---|---|---|---|
| 7,784,399 | B2 | 8/2010 | Sasine |
| 8,230,780 | B2 | 7/2012 | Sasine |
| 8,640,611 | B2 | 2/2014 | Sasine |
| 8,769,801 | B2* | 7/2014 | Lyman ............... B65B 69/0025 83/909 |
| 8,833,246 | B2 | 9/2014 | Sasine |
| 10,703,520 | B2 | 7/2020 | Sasine |
| 11,123,939 | B2* | 9/2021 | Chan .................. B30B 9/3082 |
| 2009/0029074 | A1 | 1/2009 | Sasine |
| 2009/0148629 | A1 | 6/2009 | Sasine |
| 2010/0095855 | A1 | 4/2010 | Sasine |
| 2012/0186197 | A1* | 7/2012 | Potempa ................ B65B 9/14 53/574 |
| 2013/0000261 | A1* | 1/2013 | Lyman ............... B65B 69/0025 53/381.2 |
| 2014/0172174 | A1* | 6/2014 | Poss .................. B30B 9/3007 700/275 |
| 2017/0287303 | A1* | 10/2017 | Lang ................. G08B 21/0275 |
| 2018/0056617 | A1* | 3/2018 | Chan ...................... G01G 19/52 |
| 2018/0056618 | A1* | 3/2018 | Chan .................... B30B 9/3007 |
| 2019/0124850 | A1* | 5/2019 | Okamura .............. A01F 15/071 |
| 2020/0093067 | A1* | 3/2020 | Monteyne ........... A01F 15/0715 |
| 2021/0170707 | A1* | 6/2021 | Chan .................... G06F 16/954 |
| 2021/0368689 | A1* | 12/2021 | Jawale ................... A01F 15/04 |

OTHER PUBLICATIONS

Alibaba; "Bales of Mixed Recycling Summer Children Clothing Import Used Clothes"; https://www.alibaba.com/product-detail/Bales-Of-Mixed-Recycling-Summer-Children_60334990255.html; Available as early as Aug. 22, 2019; pp. 1-14.

APC; "Plastic Film Recovery Guide"; https://plastics.americanchemistry.com/Plastic-Film-Recovery-Guide/; Sep. 1999; pp. 1-60.

CK International; "CKTR121XL Twin Ram Baler & CW Direct Wrapper"; https://youtu.be/IT3k9cXndUY; Feb. 27, 2019; pp. 1-11.

Herring, H.; "Baling Plastic without Headers"; https://www.youtube.com/watch?v=a9qawwQvwuw; Mar. 6, 2019; pp. 1-11.

Matthiessen; "Bottle Bales"; https://www.bagsplitter.com/en/pet-bottles-bales/; Available as early as Aug. 22, 2019; pp. 1-2.

Metalcraft; "RFID Bale Tag"; http://www.idplate.com/product/rfid-bale-tag/rfid-access-tracking-tags-and-rfid-hard-tags; Available as early as Aug. 22, 2019; pp. 1-4.

Ocampo, J.; "Think Twice Before Recycling Black Plastic"; https://lifehacker.com/think-twice-before-recycling-black-plastic-1832868090; Feb. 25, 2019; pp. 1-6.

Orwak; "Compacting Solutions for Waste Materials for All Types"; https://www.orwakbalers.com/solutions.html; Available as early as Aug. 22, 2019; pp. 1-5.

Orwak; "Orwak Multi 9020S"; https://www.orwakbalers.com/orwak-multi.html; Available as early as Aug. 22, 2019; pp. 1-14.

Perez, R.; "Avangard Innovative"; https://www.harcresearch.org/sites/default/files/Project_Presentation/Avangard%20-%20Rick%20Perez.pdf; Jun. 7, 2016; pp. 1-5.

Real Leaders; "Avangard Innovative is Monetizing Recyclables"; https://real-leaders.com/avangard-innovative-is-monetizing-recyclables/; Apr. 22, 2016; pp. 1-5.

* cited by examiner

SYSTEMS AND METHODS FOR BALING MATERIALS

CROSS-REFERENCE TO RELATED APPLICATION

This application claims the benefit of U.S. Provisional Application No. 62/896,499 filed Sep. 5, 2019, which is incorporated herein by reference in its entirety.

TECHNICAL FIELD

This invention relates generally to baling materials.

BACKGROUND

Generally, a retail store produces various waste materials. Some of these waste materials are recyclable. As such, in recycling these recyclable materials, the retail store contributes to reducing waste destined for a landfill. Further, the retail store may sell the recyclable materials to a recycling company. Thus, baling the recyclable materials in an efficient and for an optimum cost is advantageous.

BRIEF DESCRIPTION OF THE DRAWINGS

Disclosed herein are embodiments of systems, apparatuses and methods pertaining to baling recyclable materials. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for baling recyclable materials. In some embodiments, a system for baling recyclable materials includes a baling a machine configured to compress materials into a shape suitable for at least one of storage and transportation. By one approach, the materials may include mixed type recyclable materials. The materials do not include added cardboard header materials configured to structurally enhanced the shape having been compressed. In some implementations, the system may include baling wire and/or one or more strings and/or spools of baling wires to twine and secure the materials compressed by the baling machine, resulting in a bale including twined and compressed materials. By one approach, the system may include shrink film and/or a sheet of and/or a spool of shrink films to wrap around the bale.

In some embodiments, a method for baling recyclable materials includes placing materials inside a baling machine. By one approach, the materials may include mixed type recyclable materials. In some implementations, the method may include compressing, by the baling machine, the material into a shape suitable for at least one of storage and transportation. The materials do not include added cardboard header materials configured to structurally enhanced the shape having been compressed. Alternatively or in addition to, the method may include twining and securing the materials that have been compressed by the baling machine with one or more strings and/or spools of baling wires resulting in a bale including twined and compressed material. By one approach, the method may include wrapping the bale with a shrink film.

Figure 1:
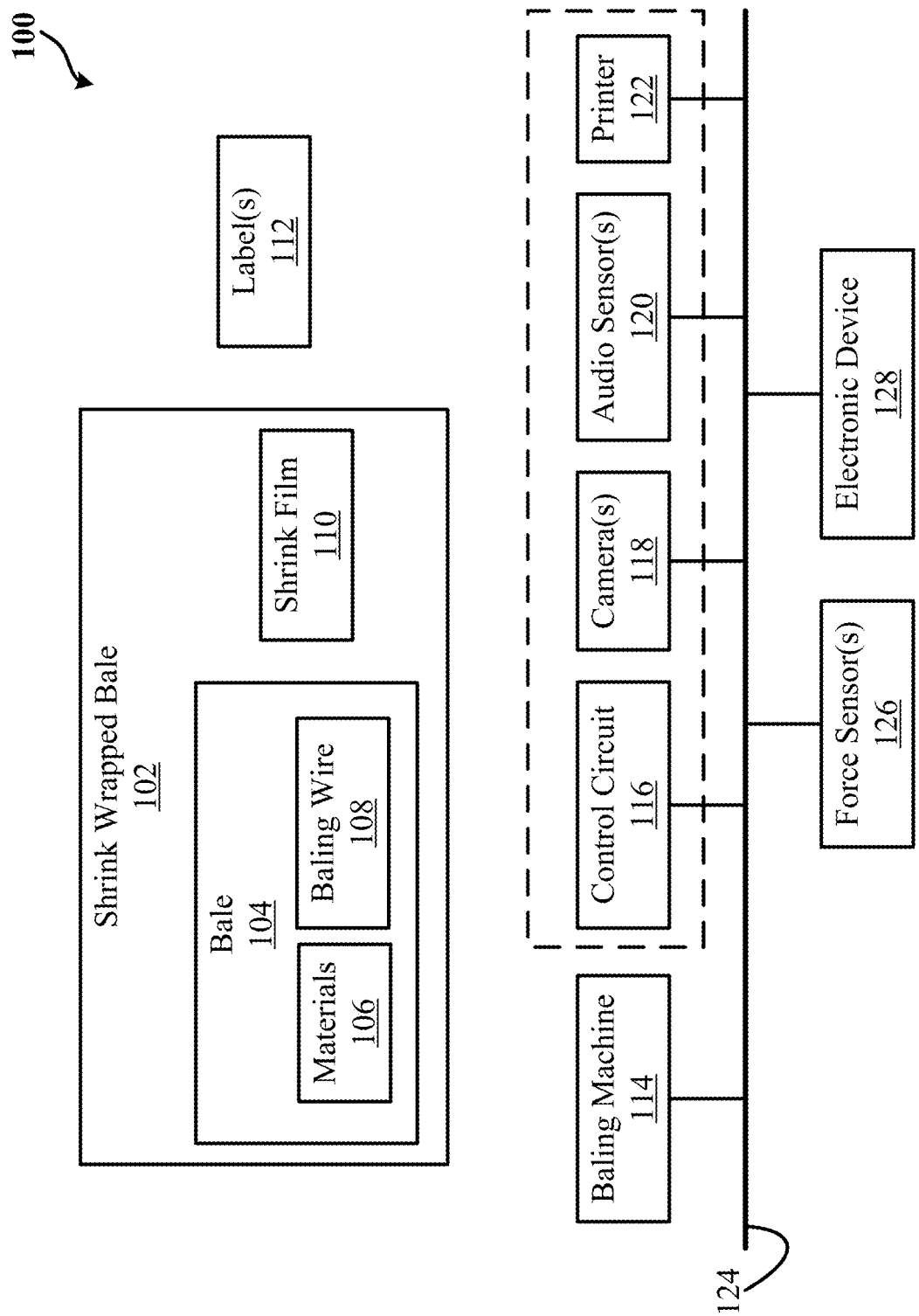
FIG. 1 illustrates a simplified block diagram of an exemplary system for baling recyclable materials in accordance with some embodiments.
Figure 2:
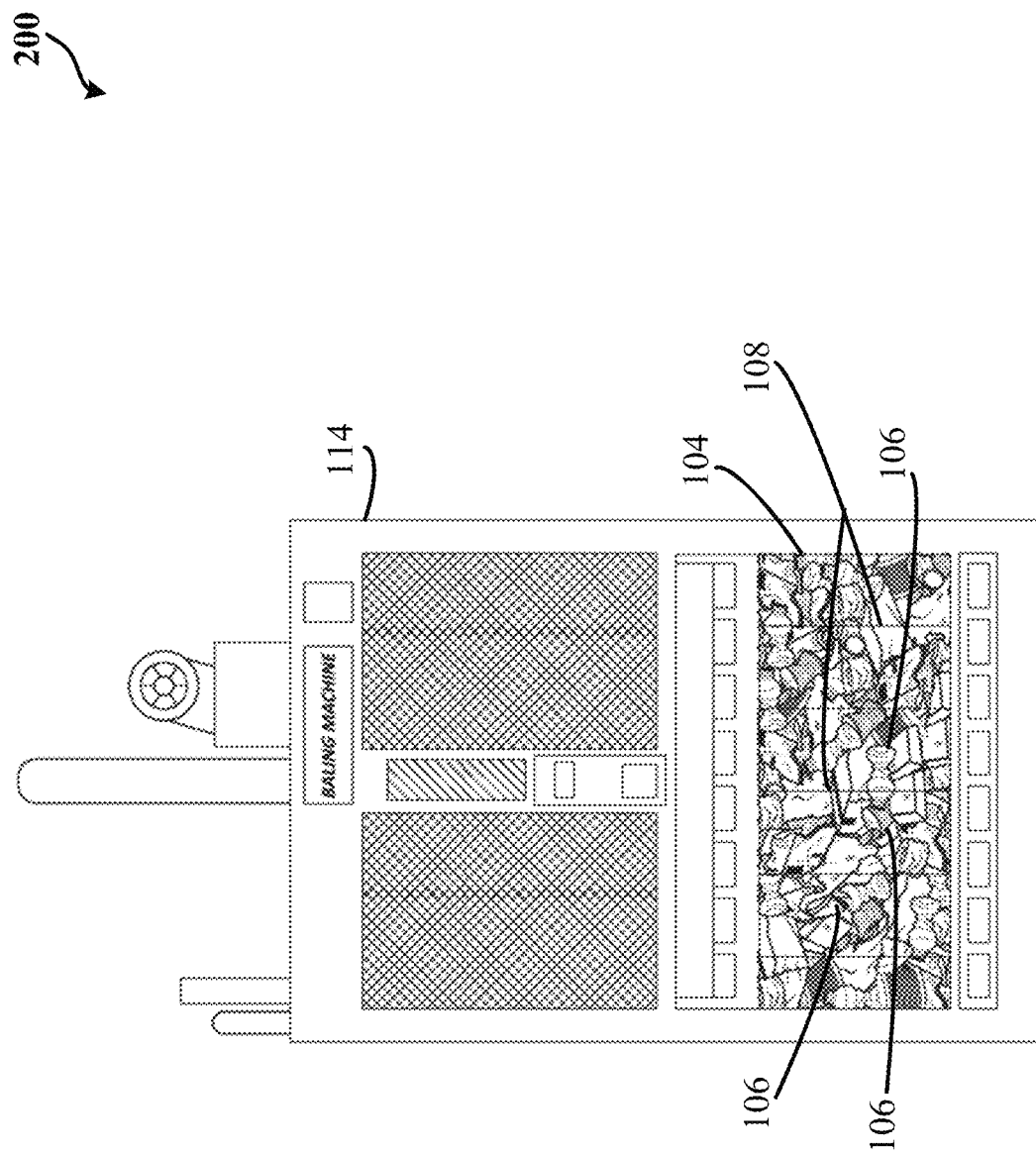
FIG. 2 is a simplified schematic illustration of an exemplary system for baling recyclable materials in accordance with some embodiments.
Figure 3A:
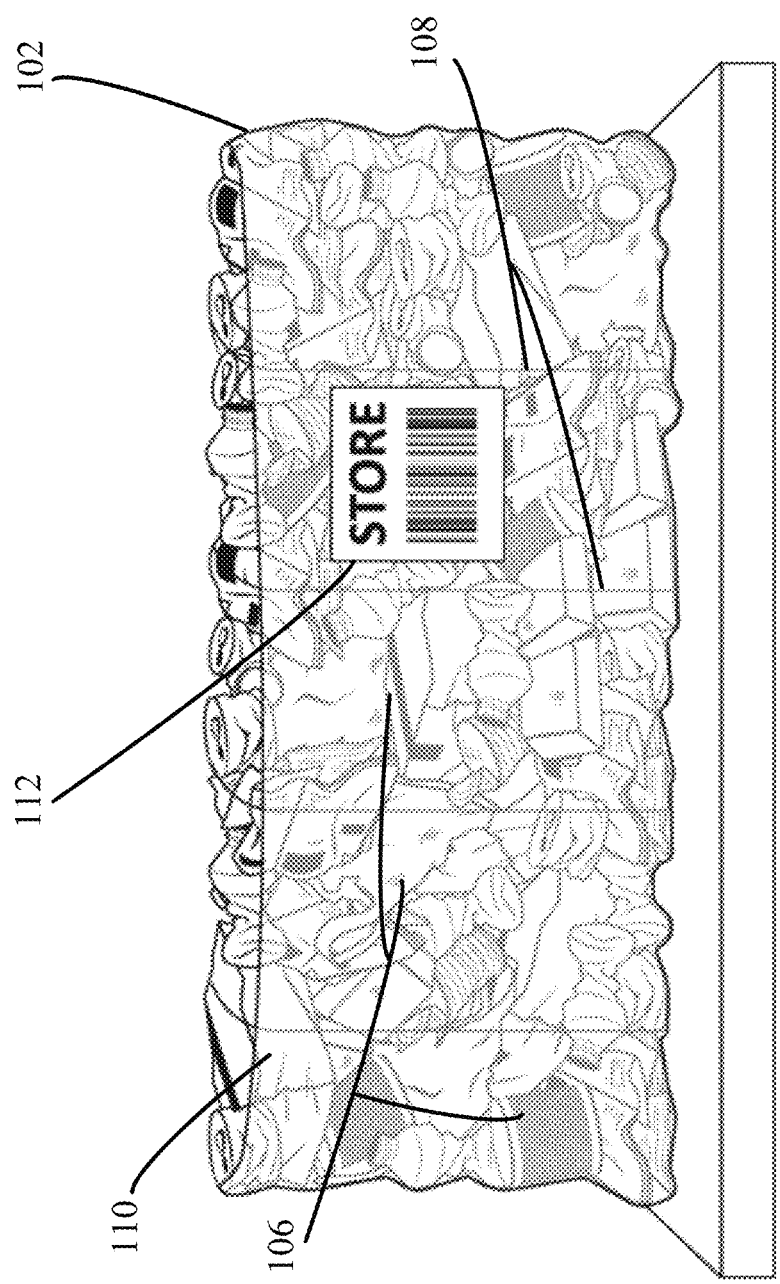
FIGS. 3A and 3B are schematic illustrations of exemplary shrink wrapped bales with labels in accordance with some embodiments.
Figure 3B:
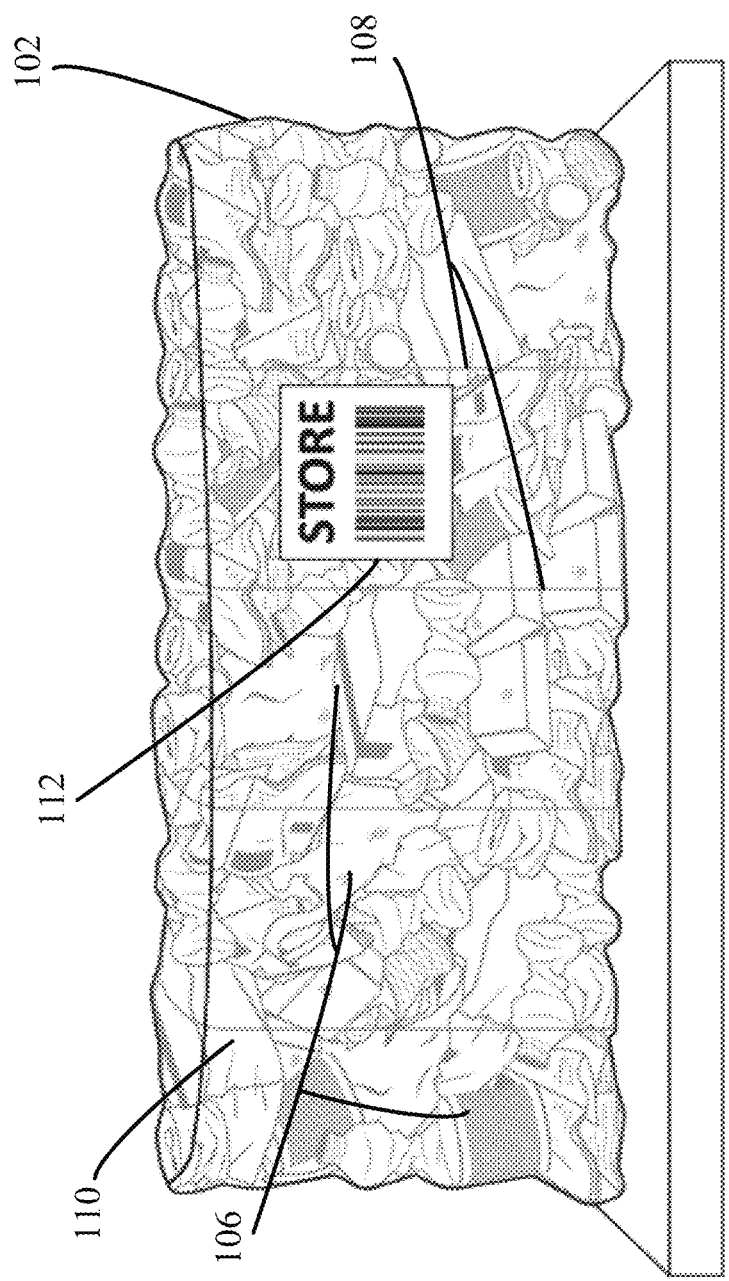
Figure 4:
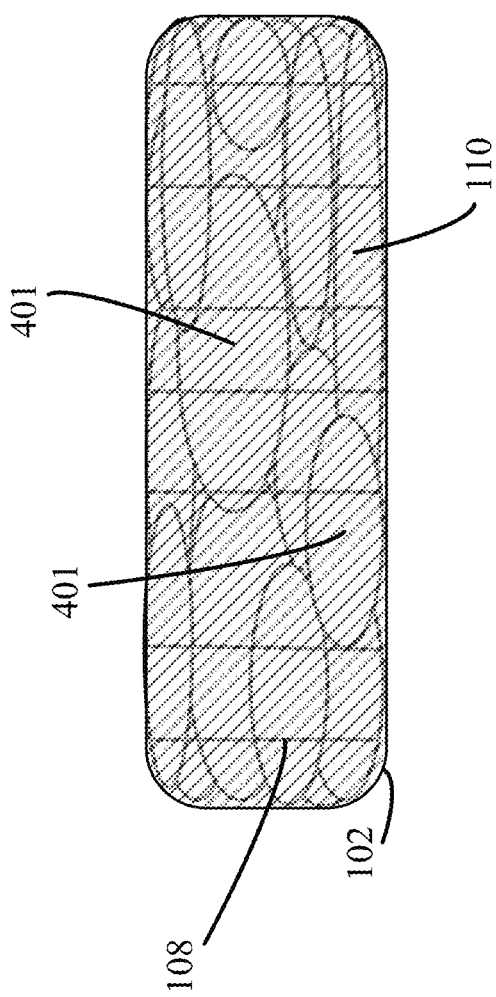
FIG. 4 is a schematic illustration of an exemplary shrink wrapped bale in accordance with some embodiments.
Figure 5:
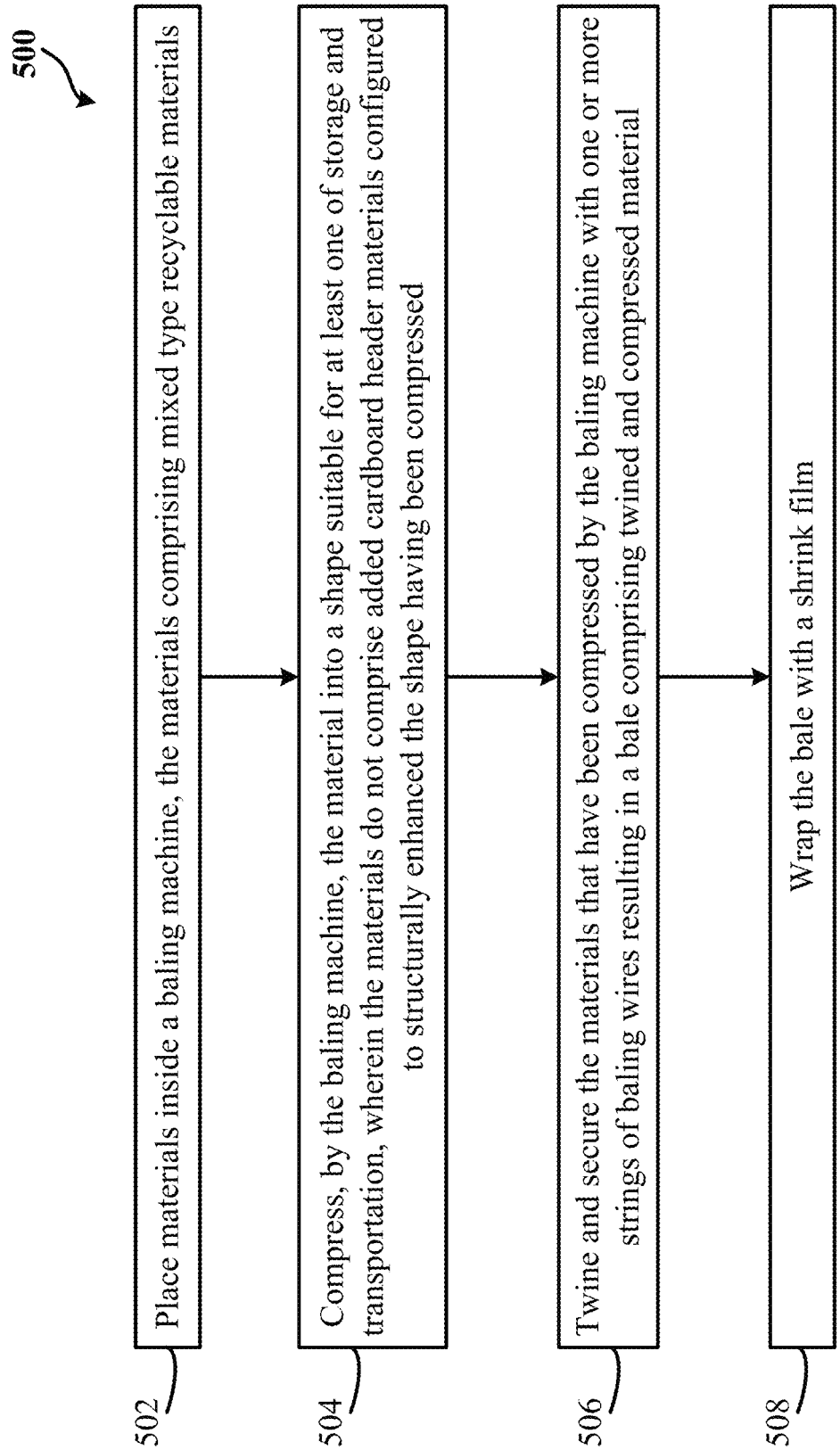
FIG. 5 shows a flow diagram of an exemplary process of baling recyclable materials in accordance with some embodiments.

To illustrate, FIGS. 1 through 6 are described below. In an illustrative non-limiting example, FIGS. 1, 2, and 5 are described contemporaneously. FIG. 1 illustrates a simplified block diagram of an exemplary system 100 for baling recyclable materials in accordance with some embodiments. FIG. 2 is a simplified schematic illustration of an exemplary system 200 for baling recyclable materials in accordance with some embodiments. FIG. 5 shows a flow diagram of an exemplary process (or method 500) of baling recyclable materials in accordance with some embodiments. For example, the system 100 includes one or more baling machines 114. By one approach, the baling machine 114 may compress materials 106 into a shape suitable for at least one of storage and transportation. In one configuration, the materials 106 may include mixed type recyclable materials. In one configuration, the mixed type recyclable materials. For example, the materials 106 may include plastic containers, plastic bottles, books, magazines, newspaper, office paper, plastic bags, aluminum cans, beverage bottles (e.g., steel food cans, aluminum beverage cans, plastic bottles, etc.), plastic hangers, plastic shrink wrapping, shopping bags and other related materials collected from customers, and/or mixed papers (e.g., books, magazines, newspaper, office paper, etc.), to name a few. However, the materials do not include added cardboard header materials configured to structurally enhanced the shape having been compressed. Conventionally, to bale recyclable materials, a layer of one or more cardboard header materials are added onto a layer of the recyclable materials prior to baling to structurally enhance the shape of the recyclable materials after having been compressed. These cardboard header materials are not part of the materials to be recycled. In fact, a layer of the cardboard header materials is specifically added to the recyclable materials strictly to structurally enhance the shape of the recyclable materials when the recyclable materials have been compressed and baled. Thus, the cardboard header materials are not recycled and, as such, they are set aside prior to recycling. By one approach, headers are dedicated sheets of material whose specific purpose for adding is to lend rigidity in baling and transporting.

In some embodiments, the materials 106 may, at step 502, be placed, inside the baling machine 114 and/or inside a compartment of one or more compartments of the baling machine 114 configured to hold the materials 106 to be baled. In some implementations, a particular type of recyclable materials may be sorted out of the materials 106 and placed first inside the baling machine 114. In another example, the same particular type of recyclable materials and/or another type of recyclable materials from the materials 106 may be sorted out and placed in between one or more portions of the remaining materials 106 and/or placed inside the baling machine 114 as the portion of materials 106 to be placed last inside the baling machine 114. In an illustrative non-limiting example, plastic bottles, plastic gallons, and/or the like may be sorted out of the materials 106 and placed first, in between, and/or last inside the baling machine 114. In another example, books, magazines, and/or the like may be sorted out of the materials 106 and placed first, in between, last, and/or among with the other sorted recyclable materials 106 inside the baling machine 114. In an illustrative non-limiting example, each type of the materials 106 may be randomly placed inside the baling machine 114 and then compressed into a single layer of intermixed of different types of recyclable materials 106. In another illustrative non-limiting example, each type of the materials 106 may be separately bagged and/or enclosed in a bag prior to placing the material 106 inside the baling machine 114. In such an example, the material 106 that are twined using the baling wire 108 and compressed by the baling machine 114 may include a plurality of bags that are combinedly secured by the baling wire 108 and wrapped by the shrink film 110. By one approach, each bag of the plurality of bags may enclose a particular type of recyclable material different from other types of recyclable materials enclosed by other bags of the plurality of bags. For example, a first bag may include papers while a second bag may include aluminum cans. In another example, a third bag may include plastic bags. In some implementations, a bag may include a transparent bag where the particular type of recyclable material can be readily seen and identified. In some implementations, a bag may have a particular thickness capable of holding and enclosing the recyclable materials or items inside the bag despite of being compressed into a shape. In an illustrative non-limiting example, the plurality of bags is randomly placed in the baling machine 114. For example, as items/materials are received, the items/materials are sorted, placed in a corresponding bag, and/or stored until the corresponding bag is full. Alternatively or in addition to, the bags are placed in the baling machine 114 as the bags are received at the baling place. In some implementations, the bag may have sufficient strength to withstand substantial tearing when the materials 106 are compressed.

In some implementations, the system 100 may include the baling wire 108. By one approach, the baling machine 114 may, at step 504, compress the material 106 into a shape suitable for at least one of storage and transportation. The materials 106 do not include added cardboard header materials configured to structurally enhanced the shape having been compressed. By one approach, after compressing the materials 106, the materials 106 are twined and/or secured with the one or more strings and/or spools of baling wires 108, at step 506, resulting in a bale 104. As such, the bale 104 may include the twined and compressed materials 106. By one approach, the baling wire 108 may include a single loop wire, a double-loop wire, a boxed wire, a high tensile wire, a plastic wire, a metal wire, and/or other types of commercially available baling wires. In some configurations, the baling wire 108 may be used to twine and/or secure the materials 106 that had been compressed by the baling machine 114. In such a configuration, the twined and compressed materials 106 results in a bale 104. In one scenario, the twining of the compressed materials 106 may be based on an industry accepted method and/or standard for securing items for storage and/or transport. In some embodiments, the bale 104 may be wrapped using the shrink film 110, at step 508. For example, the shrink film 110 (also called shrink wrap) may include a material made up of polymer plastic film. By one approach, the bale 104 may be wrapped with the shrink film 110. In one example, the shrink wrapping of the bale 104 may securely hold the materials 106 in a tight fit to keep and/or maintain the compressed shape of the materials 106. In another example, the shrink wrapping of the bale 104 may prevent items of the materials 106 from falling off the bale 104. In such example, the shrink wrapping of the bale 104 results in a shrink wrapped bale 102. In some embodiments, one or more labels 112 may be attached on the shrink wrapped bale 102. For example, each of the one or more labels 112 may include a listing of types of materials compressed by the baling machine 114, an identification of a retail store where the materials 106 originated, and/or date and timestamp of baling.

In some embodiments, the system 100 may include one or more audio sensors 120. By one approach, the audio sensor 120 may be located proximate the baling machine 114. In one example, the audio sensor 120 may be coupled to the baling machine 114 and placed and/or located in an area capable of capturing sound generated when the materials 106 are placed in the baling machine 114 (e.g., inside the compartment where the materials 106 are placed but in an area safe from being damaged by the baling machine 114 when the baling machine is compressing the materials 106, and an area immediately outside an opening to the compartment where the materials 106 are placed inside the baling machine 114, to name a few areas of where the audio sensor 120 may be located). In one scenario, the audio sensor 120 may include dynamic microphone, condenser microphone, ribbon microphones, carbon microphones, and/or other types of sensors, microphones, and/or instruments capable of converting sound waves into electrical energy variations which may be amplified, transmitted, and/or recorded. In some configurations, the system 100 may include a control circuit 116 operatively coupled to the baling machine 114. By one approach, the control circuit 116 may be proximate the baling machine 114. Alternatively or in addition to, the control circuit 116 may be communicatively coupled to the baling machine 114 via a network 124. For example, the control circuit 116 may include a processor, a computer, a server, a cluster node, a portable electronic device (e.g., a laptop, a smartphone, a table, an iPad, and/or the like), and/or a microprocessor, among other types of control circuits capable of executing and/or providing instructions and/or commands. In some configurations, the control circuit 116 may be coupled with the audio sensor 120 via the network 124. For example, the network 124 may include a communication bus, a wired and/or a wireless network, Internet, and/or other types of networks capable of coupling one electronic and/or mechanical component with another electronic and/or mechanical component. By one approach, the control circuit 116 may receive sound captured by the audio sensor 120. In such an approach, the control circuit 116 may determine the types of materials to be compressed and/or compressed by the baling machine 114 based on the sound captured by the audio sensor 120. In one configuration, the control circuit 116 may estimate a corresponding percentage value to be associated with each of the determined types of materials based on the sound. In one scenario, a listing on the one or more labels 112 may include the corresponding percentage value associated with each of the determined types of materials. For example, the control circuit 116 may process the sound in accordance with publicly available and/or commercially available sound processing algorithm capable of distinguishing one sound from another sound, such that control circuit 116 may identify the sound and associate the sound to a type of material. In such an example, the control circuit 116 may identify the sound of an aluminum can from the sound of papers and/or the sound of plastic containers as they are thrown/placed in the baling machine 114. As such, based on the control circuit 116 determining the type of materials included in the materials 106, the control circuit 116 may estimate a percentage value for each of the determined type of materials relative to a weight and/or a volume of the materials 106. In one configuration, the one or more labels 112 may include a listing of the determined type of materials along with each of the materials' corresponding percentage value. In some embodiments, the system may include a printer 122. In one configuration, the printer 122 may be coupled to the control circuit 116 via the network 124. In one implementation, the printer 122 may output the one or more labels 112. For example, the control circuit 116 may cause the printer 122 to print a label 112 including the listing described above. In one scenario, a first label of the one or more labels 112 may be attached on a side of the shrink wrapped bale 102 while a second label of the one or more labels 112 may be attached on another side of the shrink wrapped bale 102 that is opposite the side the first label is attached. In some implementations, the one or more labels 112 may include a reusable electronic shelf label, a radio frequency identifier (RFID), a machine-readable identifier, a barcode, a QR code, and/or a printed human readable identifier. For example, the label 112 may include an identifier coded with the listing of types of materials and/or corresponding percentage values in the shrink wrapped bale 102, source and/or originator of the materials 106, and/or date and time of baling, among other information associated with the shrink wrapped bale 102. In yet another example, the printer 122 may include a portable printer communicatively coupled to the control circuit 116. In yet another example, the printer 122 may be portably attached to the control circuit 116. In yet another example, information regarding the constituent materials in the materials 106, chain of custody, originating baling location and/or source of recyclable materials, and/or date and timestamp of a change in chain of custody may be coded in and/or associated with the reusable electronic shelf label, the radio frequency identifier (RFID), the machine-readable identifier, the barcode, and/or the QR code printed on and/or embedded in the label 112.

In some configurations, the system 100 may include one or more cameras 118. For example, the camera 118 may be proximate the baling machine 114. In one example, the camera 118 may be coupled to the baling machine 114. In one scenario, the camera 118 may be placed and/or located in an area capable of capturing one or more images of the materials 106 when the materials 106 are placed in the baling machine 114 (e.g., inside the compartment where the materials 106 are placed but in an area safe from being damaged by the baling machine 114 when the baling machine is compressing the materials 106, and an area immediately outside an opening to the compartment where the materials 106 are placed inside the baling machine 114, to name a few areas of where the cameras 118 may be located). In one scenario, the camera 118 may include high definition camera, low definition camera, and/or high speed camera, to name a few. In some implementations, the camera 118 may be coupled to the control circuit 116 via the network 124. By one approach, the control circuit 116 may receive one or more images captured by the one or more cameras 118. For example, the image may include an image as the materials 106 are placed inside the baling machine 114. Alternatively or in addition to, the control circuit 116 may include determining the types of materials compressed by the baling machine 114 based on the one or more images. For example, the control circuit 116 may process the images using one or more digital signal processing techniques commercially and/or publicly available. In one configuration, the control circuit 116 may estimate a corresponding percentage value associated with each of the determined types of materials based on the one or more images. By one approach, after processing the images, the control circuit 116 may identify the types of materials to be compressed and/or being compressed by the baling machine 114. In an illustrative non-limiting example, the control circuit 116 may identify paper materials (e.g., books, magazines, etc.), bottles, plastic containers, plastic hangers, to name a few. In response, the control circuit 116 may estimate, based on the processing of the images, a percentage value for each type of identified materials 106 relative to the weight and/or volume of the materials 106 that were placed in the baling machine 114. In one scenario, listing on the one or more labels 112 may include the corresponding percentage value associated with each of the determined types of materials. In some embodiments, the materials 106 and/or the mixed type recyclable materials may include a cardboard. In other embodiments, the materials 106 and/or the mixed type recyclable materials do not include a cardboard. In yet another embodiments, the materials 106 and/or the mixed type recyclable materials do not include a corrugated cardboard.

By one approach, the control circuit 116 may communicatively couple to the baling machine 114. For example, the control circuit 116 may operate the baling machine 114 and cause the printer 122 to output one or more labels 112 that are then attached on a surface of the shrink wrapped bale 102. In some configurations, the system 100 may include one or more force sensors 126. For example, the force sensor 126 may include tensile force, compression force, and/or tensile and compression force sensors, among other types of force sensors commercially available. By one approach, the force sensor 126 may be coupled to the baling machine. In one example, the force sensor 126 may be placed and/or located in an area capable of capturing an amount of compression force applied to compress the materials 106 into a shape. In one configuration, the area may be in an area safe from being damaged by the baling machine 114 when the baling machine is compressing the materials 106. Alternatively or in addition to, the one or more audio sensors 120 may capture the sound generated when the materials 106 are being compressed by the baling machine 114. Alternatively or in addition to, the one or more cameras 118 may capture one or more images of the materials 106 when the materials 106 are placed in the baling machine 114. In some implementations, the control circuit 116 may be/coupled to the force sensor, the audio sensor, and/or the camera via the network 124. Alternatively or in addition to, the control circuit 116 may determine the types of materials compressed by the baling machine 114 based on the amount of compression force captured by the force sensor 126, the sound captured by the audio sensor 120, and/or the one or more images captured by the camera 118. For example, the control circuit 116 may access a database including a plurality of rate of compressions and the associated corresponding composition of materials that may produce and/or generate each particular rate of compression. In response, the control circuit 116 may process the sound and/or the one or more images and/or compare with the associated corresponding composition of materials that may produce and/or generate each particular rate of compression. In response to the comparison, the control circuit 116 may determine types of materials in the materials 106 based on cooperative processing, comparison, and/or verification of the one or more images, the sound, and/or the amount of compression force. Alternatively or in addition to, the control circuit 116 may estimate a corresponding percentage value associated with each of the determined types of materials based on at least one of the one or more images, the sound, and the amount of compression force. By one approach, the control circuit 116 may cause the printer 122 to output and/or print a label 112 listing the corresponding percentage value associated with each of the determined types of materials. Alternatively or in addition to, the system 100 may include an electronic device 128. In some configurations, the electronic device 128 may communicatively couple to the control circuit 116 via the network 124. By one approach, the electronic device may include a touchscreen, a keyboard, a smartphone, and/or a reader (e.g., badge reader), among other types of electronic devices capable of receiving an input identifying a user performing the baling of the materials 106. In an illustrative non-limiting example, prior to the start of baling operation, a user may scan an identification badge to initiate the baling operation. In such an example, the control circuit 116 may couple to the force sensor 126, the audio sensor 120, the camera 118, and/or the electronic device 128 via the network 124. In one configuration, the control circuit 116 may determine that the bale 104 has been contaminated based on data captured by at least one of the one or more force sensors 126, the one or more audio sensors 120, and/or the one or more cameras 118. For example, the control circuit 116 may process each data captured by the one or more force sensors 126, the one or more audio sensors 120, and/or the one or more cameras 118 based in part on one or more commercially available algorithms and/or signal processing techniques to determine that a contamination event had occurred (e.g., a glass bottle broke while the materials 106 are being compressed and/or food waste, non-recyclable materials and/or items were inadvertently included in the materials 106, among other types of events that may render the shrink wrapped bale 102 to have a market value that is less than a market value of other shrink wrapped bale 102 with no contamination event that occurred during its baling process). In response to a determination that a contamination event had occurred, the control circuit 116 may provide an alert message. For example, the alert message may be provided to an associate's electronic device and/or a database configured to store the alert message. In one scenario, the database may store a plurality of alert messages over a period of time. By one approach, the alert message may indicate that the user who provided the input to the electronic device may be a candidate for a training and/or retraining on the initiation and/or operation of bailing the materials 106 and/or mixed type recycle materials. For example, the alert message may include the input identifying the user. Thus, a retail store may use the alert messages stored in the database to assess the one or more effects resulting from contaminating the bale 104 over the period of time (e.g., loss potential revenue and/or recouped cost associated with recyclable waste materials produced and/or generated by the retail store), patterns, and/or possible need for training and/or retraining of one or more users of the one or more baling machines 114.

In some embodiments, prior to placing the materials 106 in the baling machine 114, one or more types of recyclable materials may be sorted out of the materials 106. By one approach, the sorted out recyclable materials may be placed first, in between, and/or after the remaining portion of the materials 106 are placed in the baling machine 114 to add to the rigidity and/or secureness' of the resulting shrink wrapped bale 102. As such, a retail store may save on cost associated with recycling waste materials produced and/or generated by the retail store by using items and/or materials from the materials 106 and/or the mixed type recyclable materials that are part of the recycling waste materials produced and/or generated by the retail store, instead of specifically adding cardboard header materials that are not part of the recycling waste materials produced and/or generated by the retail store. In other embodiments, one or more headers that are not cardboard materials may be added onto the materials 106 to further structurally enhance the compressed shape of the materials 106. For example, the one or more headers may include Styrofoam polymer based material, plywood, and/or plastic polymer based material headers, among other types of materials that are not cardboard materials that may be added onto the materials 106 as headers.

In illustrative non-limiting examples, FIGS. 2, 3A, 3B, and 4 are shown. FIG. 2 is a simplified schematic illustration of an exemplary system 200 for baling recyclable materials in accordance with some embodiments. FIGS. 3A, 3B, and 4 are schematic illustrations of exemplary shrink wrapped bales 102 with labels 112 in accordance with some embodiments. FIG. 4 is a schematic illustration of an exemplary shrink wrapped bale 102 in accordance with some embodiments. For example, in FIG. 2, an exemplary bale 104 is shown as the result of the materials 106 being compressed by the baling machine 114 and twined and/or secured by the baling wire 108. In FIG. 3A, an exemplary shrink wrapped bale 102 is shown. By one approach, the shrink wrapped bale 102 includes the bale 104 having the compressed materials 106 twined and/or secured by the baling wire 108 and subsequently wrapped by the shrink film 110 in substantially one direction. For example, as shown in FIG. 3A, the shrink film 110 may be substantially wrapped around the width and/or wider side of the bale 104. In such an example, the top and bottom sides of the bale 104 are not wrapped by the shrink film 110 and/or left exposed. In another example, a label 112 may be attached to the shrink wrapped bale 102. In such an example, the label 112 may include the originating retail store name and a barcode. In other examples, the label 112 may including one or more combinations of originating retail store name, date and timestamp of baling, one or more machine readable identifiers (e.g., QR code, barcode, etc.), to name a few.

In FIG. 3B, an exemplary shrink wrapped bale 102 is shown. By one approach, the shrink wrapped bale 102 includes the bale 104 having the compressed materials 106 twined and/or secured by the baling wire 108 and subsequently wrapped by the shrink film 110 in substantially two directions. As described herein, the wrapping of the bale 104 using the shrink film 110 may be in one or more directions (e.g., one direction side wrapped around the wider side, one direction side wrapped around the height side, wrapped around diagonally from one corner to the opposite corner, and/or any combination thereof). In some embodiments, the bale 104 may be wrapped in multiple directions using a continuous sheet of shrink film 110. For example, as shown in FIG. 3A, the shrink film 110 may be substantially wrapped around the width and/or wider side of the bale 104 and substantially wrapped around the height and/or the length of the bale 104. In another example, the bale 104 may be entirely wrapped by the shrink film 110. In another example, the bale 104 may be wrapped around with some portions exposed. In yet another example, a label 112 may be attached to the shrink wrapped bale 102. In such an example, the label 112 may include the originating retail store name and a barcode. In other examples, the label 112 may including one or more combinations of originating retail store name, date and timestamp of baling, one or more machine readable identifiers (e.g., QR code, barcode, etc.), to name a few.

By one approach, each of the bale 104 shown in FIGS. 3A and 3B is a single layer of compressed intermixed of different types of recyclable materials that is secured by the baling wire 108 and wrapped by the shrink film 110. In such an approach, each item and/or material in the materials 106 is randomly placed in the baling machine regardless of the type of materials. In some configurations, the bale 104 may be entirely wrapped with the shrink film 110. In some configurations, the bale 104 may be at least partially wrapped with the shrink film 110. In yet some configurations, the bale 104 may be wrapped with the shrink film 110 at least in part based on an industry method and/or standard for wrapping materials and/or items for storage and/or transport. Other embodiments of an exemplary shrink wrapped bale 102 is shown in FIG. 4. In FIG. 4, the exemplary shrink wrapped bale 102 includes the bale 104 having the compressed materials 106 sorted in separate bags 401. In such an embodiment, the bags 401 are twined and/or secured by the baling wire 108 and subsequently wrapped by the shrink film 110. It is understood that the bale 104 shown in FIG. 4 may be wrapped in one or more directions as described herein. For example, prior to placing the materials 106 in the baling machine 114, the materials 106 may be sorted out based on a type of material (e.g., papers, aluminum cans, plastic bottles, etc.). In such an example, each type of material is enclosed in a bag 401 and/or bagged separately. Thus, the separately bagged materials 106 may be placed in the baling machine 114, compressed, and are combinedly secured by the baling wire 108 and wrapped by the shrink film 110. As such, an exemplary shrink wrapped bale 102, as shown in FIG. 4, may include a plurality of bags 401 that are combinedly secured by the baling wire 108 and wrapped by the shrink film 110. In one configuration, each bag of the plurality of bags 401 may enclose a particular type of recyclable material different from other types of recyclable materials enclosed by other bags of the plurality of bags 401. In some embodiments, as described herein, mixed type recyclable materials are baled successfully without the use of a header due to in part on at least one of and/or a combination of one or more of the baling wire 108, the shrink film 110, the separate bagging of materials based on type, and/or the mixed type recyclable materials being baled. In some embodiments, the materials 106 may be initially stored at one or more storage containers until there is enough of the materials 106 to bale. In such an embodiment, a facility having a single baling machine may perform a baling of strictly cardboard materials while waiting for the right amount of the materials 106 to be separately baled.

Figure 6:
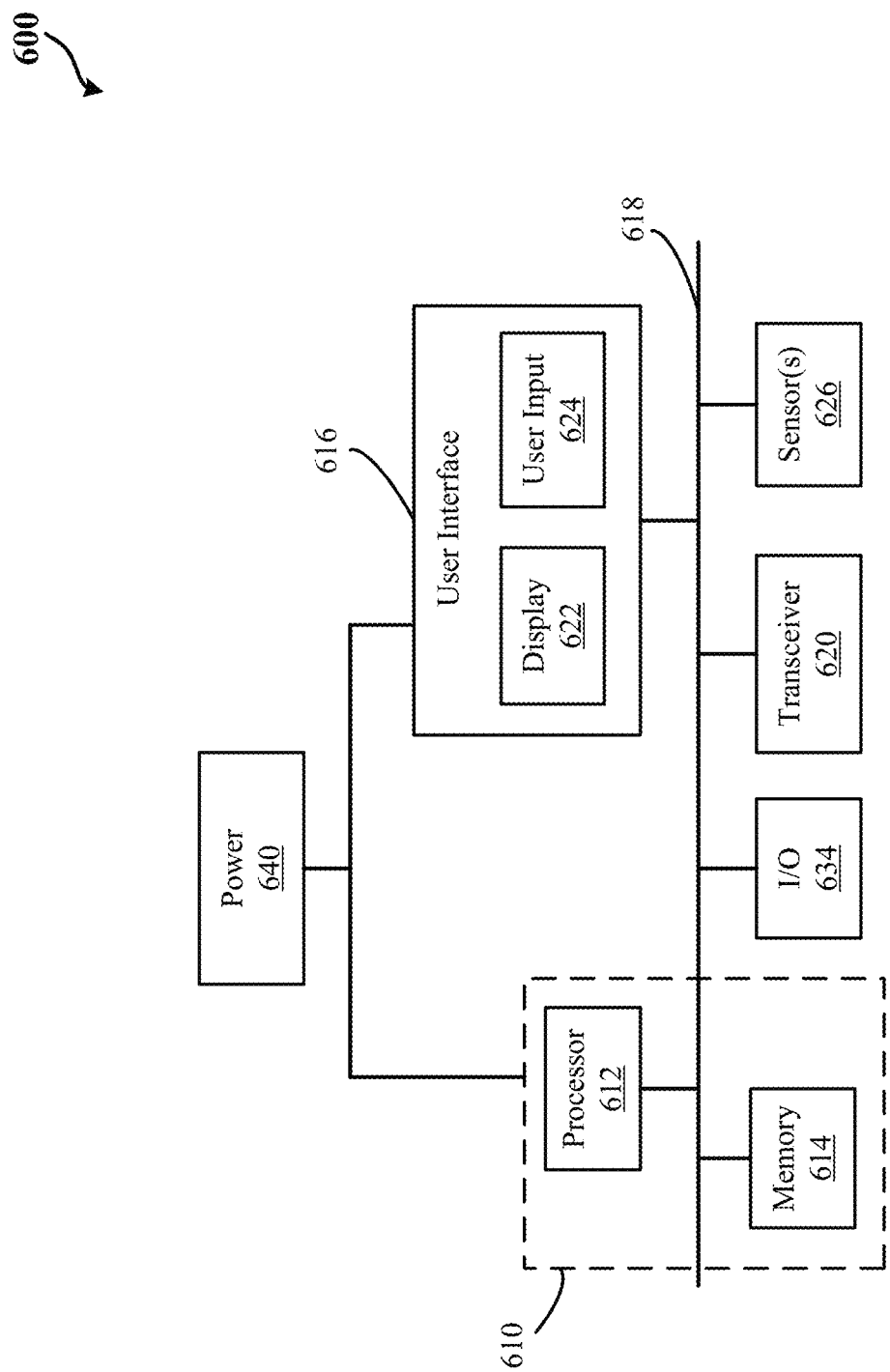
FIG. 6 illustrates an exemplary system for use in implementing methods, techniques, devices, apparatuses, systems, servers, sources and monitoring item distribution, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 6 illustrates an exemplary system 600 that may be used for implementing any of the components, circuits, circuitry, systems, functionality, apparatuses, processes, or devices of the system 100 of FIG. 1, the system 200 of FIG. 2, the method 500 of FIG. 5, and/or other above or below mentioned systems or devices, or parts of such circuits, circuitry, functionality, systems, apparatuses, processes, or devices. For example, the system 600 may be used to implement some or all of the system for baling recyclable materials 106, the baling machine 114, the network 124, the control circuit 116, the camera(s) 118, the audio sensor(s) 120, the printer 122, the force sensor(s) 126, the electronic device 128, and/or other such components, circuitry, functionality and/or devices. However, the use of the system 600 or any portion thereof is certainly not required.

By way of example, the system 600 may comprise a processor module (or a control circuit) 612, memory 614, and one or more communication links, paths, buses or the like 618. Some embodiments may include one or more user interfaces 616, and/or one or more internal and/or external power sources or supplies 640. The control circuit 612 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 612 can be part of control circuitry and/or a control system 610, which may be implemented through one or more processors with access to one or more memory 614 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 600 may be used to implement one or more of the above or below, or parts of, components, circuits, systems, processes and the like. For example, the system 600 may implement the system for baling recyclable materials 106 with the control circuit 116 being the control circuit 612.

The user interface 616 can allow a user to interact with the system 600 and receive information through the system. In some instances, the user interface 616 includes a display 622 and/or one or more user inputs 624, such as buttons, touch screen, track ball, keyboard, mouse, etc., which can be part of or wired or wirelessly coupled with the system 600. Typically, the system 600 further includes one or more communication interfaces, ports, transceivers 620 and the like allowing the system 600 to communicate over a communication bus, a distributed computer and/or communication network (e.g., a local area network (LAN), the Internet, wide area network (WAN), etc.), communication link 618, other networks or communication channels with other devices and/or other such communications or combination of two or more of such communication methods. Further the transceiver 620 can be configured for wired, wireless, optical, fiber optical cable, satellite, or other such communication configurations or combinations of two or more of such communications. Some embodiments include one or more input/output (I/O) interface 634 that allow one or more devices to couple with the system 600. The I/O interface can be substantially any relevant port or combinations of ports, such as but not limited to USB, Ethernet, or other such ports. The I/O interface 634 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 626 to provide information to the system and/or sensor information that is communicated to another component, such as the baling machine 114, the network 124, the control circuit 116, the camera(s) 118, the audio sensor(s) 120, the printer 122, the force sensor(s) 126, the electronic device 128, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 600 comprises an example of a control and/or processor-based system with the control circuit 612. Again, the control circuit 612 can be implemented through one or more processors, controllers, central processing units, logic, software and the like. Further, in some implementations the control circuit 612 may provide multiprocessor functionality.

The memory 614, which can be accessed by the control circuit 612, typically includes one or more processor readable and/or computer readable media accessed by at least the control circuit 612, and can include volatile and/or nonvolatile media, such as RAM, ROM, EEPROM, flash memory and/or other memory technology. Further, the memory 614 is shown as internal to the control system 610; however, the memory 614 can be internal, external or a combination of internal and external memory. Similarly, some or all of the memory 614 can be internal, external or a combination of internal and external memory of the control circuit 612. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 614 can store code, software, executables, scripts, data, content, lists, programming, programs, log or history data, user information, customer information, product information, and the like. While FIG. 6 illustrates the various components being coupled together via a bus, it is understood that the various components may actually be coupled to the control circuit and/or one or more other components directly.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for baling recyclable materials, the system comprising:
   a baling machine configured to compress materials into a shape suitable for at least one of storage and transportation;
   the materials comprising mixed type recyclable materials, the materials not comprising added cardboard header materials configured to structurally enhanced the shape having been compressed;
   baling wire configured to twine and secure the materials compressed by the baling machine resulting in a bale comprising twined and compressed materials;
   shrink film configured to wrap around the bale; and
   a sensor comprising at least one of:
     an audio sensor proximate the baling machine and configured to capture sound generated when the materials are placed in the baling machine; and
     a force sensor coupled to the baling machine and configured to capture an amount of compression force applied to compress the materials into the shape;
   a control circuit coupled to the baling machine, the control circuit configured to:
     receive the sound from the audio sensor;
     determine types of materials compressed by the baling machine based on the sound; and
     estimate a corresponding percentage value to be associated with each of the determined types of materials based on the sound.

2. The system of claim 1, further comprising one or more labels configured to attach on the shrink wrapped bale, wherein each of the one or more labels comprises a listing of the types of materials compressed by the baling machine, an identification of a retail store where the materials originated, and date and timestamp of baling.

3. The system of claim 2,
   wherein the listing on the one or more labels comprises the corresponding percentage value associated with each of the determined types of materials; and further comprising:
   a printer coupled to the control circuit and configured to output the one or more labels comprising the listing.

4. The system of claim 2, wherein a label of the one or more labels is attached on each of two opposite sides of the shrink wrapped bale.

5. The system of claim 2, wherein the one or more labels comprises a reusable electronic shelf label, a radio frequency identifier (RFID), a machine-readable identifier, and a printed human readable identifier.

6. The system of claim 1, further comprising:
   one or more cameras proximate the baling machine, the one or more cameras configured to capture one or more images of the materials when the materials are placed in the baling machine,
   wherein the control circuit is further configured to:
     receive the one or more images captured by the one or more cameras;
     determine the types of materials compressed by the baling machine based on the one or more images; and estimate the corresponding percentage value associated with each of the determined types of materials based on the one or more images, wherein a listing on one or more labels comprises the corresponding percentage value associated with each of the determined types of materials; and a printer coupled to the control circuit and configured to output the one or more labels comprising the listing.

7. The system of claim 1, wherein the twined and compressed materials comprise a single layer of compressed intermixed of different types of recyclable materials that is secured by the baling wire and wrapped by the shrink film.

8. The system of claim 1, wherein the twined and compressed materials comprises a plurality of bags that are combinedly secured by the baling wire and wrapped by the shrink film, and wherein each bag of the plurality of bags encloses a particular type of recyclable material of the recyclable materials different from other types of the recyclable materials enclosed by other bags of the plurality of bags.

9. The system of claim 1, wherein the materials comprise plastic containers, plastic bottles, books, magazines, newspaper, office paper, plastic bags, aluminum cans, beverage bottles, plastic hangers, plastic shrink wrapping, and shopping bags.

10. The system of claim 1, wherein the materials do not comprise a cardboard.

11. The system of claim 1, wherein the control circuit is further configured to operate the baling machine and cause a printer to output one or more labels that are then attached on a surface of the shrink wrapped bale.

12. The system of claim 1, wherein the control circuit is further configured to assess a characteristic of the materials in a given bale based on data from the sensor.

13. The system of claim 1, further comprising the bale, the bale consisting of:
the mixed type recyclable materials having been compressed;
the baling wire having twined and secured the bale; and
the shrink film having wrapped the bale.

14. The system of claim 13, wherein the mixed type recyclable materials comprise a first layer portion and a second layer portion, and wherein the first layer portion comprises a first type of recyclable materials and the second layer portion comprises a second type of recyclable materials.

15. A system for baling recyclable materials, the system comprising:
a baling machine configured to compress materials into a shape suitable for at least one of storage and transportation;
the materials comprising mixed type recyclable materials, the materials not comprising added cardboard header materials configured to structurally enhanced the shape having been compressed;
baling wire configured to twine and secure the materials compressed by the baling machine resulting in a bale comprising twined and compressed materials;
shrink film configured to wrap around the bale;
a force sensor coupled to the baling machine and configured to capture an amount of compression force applied to compress the materials into the shape;
an audio sensor proximate the baling machine and configured to capture sound generated when the materials are placed in the baling machine;
a camera proximate the baling machine, the camera configured to capture one or more images of the materials when the materials are placed in the baling machine; and
a control circuit coupled to the force sensor, the audio sensor, and the camera, the control circuit configured to:
determine types of materials compressed by the baling machine based on the amount of compression force captured by the force sensor, the sound captured by the audio sensor, and the one or more images captured by the camera; and
estimate a corresponding percentage value associated with each of the determined types of materials based on the one or more images, wherein a listing on one or more labels comprises the corresponding percentage value associated with each of the determined types of materials.

16. A system for baling recyclable materials, the system comprising:
a baling machine configured to compress materials into a shape suitable for at least one of storage and transportation;
the materials comprising mixed type recyclable materials, the materials not comprising added cardboard header materials configured to structurally enhanced the shape having been compressed;
baling wire configured to twine and secure the materials compressed by the baling machine resulting in a bale comprising twined and compressed materials;
shrink film configured to wrap around the bale;
a force sensor coupled to the baling machine and configured to capture an amount of compression force applied to compress the materials into the shape;
an audio sensor proximate the baling machine and configured to capture sound generated when the materials are placed in the baling machine;
a camera proximate the baling machine, the camera configured to capture one or more images of the materials when the materials are placed in the baling machine;
an electronic device coupled to a control circuit, the electronic device configured to receive an input identifying a user performing baling of the materials; and
the control circuit coupled to the force sensor, the audio sensor, the camera, and the electronic device, the control circuit configured to:
determine that the bale has been contaminated based on data captured by at least one of the force sensor, the audio sensor, and the camera; and
in response to the determination that the bale has been contaminated, provide an alert message indicating that the user is a candidate for a training on bailing the materials, wherein the alert message comprises the input identifying the user.

* * * * *